United States Patent [19]

Cava et al.

[11] Patent Number: 5,658,485
[45] Date of Patent: Aug. 19, 1997

[54] PYROCHLORE BASED OXIDES WITH HIGH DIELECTRIC CONSTANT AND LOW TEMPERATURE COEFFICIENT

[75] Inventors: Robert Joseph Cava, Bridgewater; James Joseph Krajewski, Raritan; William Frederick Peck, Bridgewater, all of N.J.

[73] Assignee: Lucent Technologies Inc., Murray Hill, N.J.

[21] Appl. No.: 538,318

[22] Filed: Oct. 3, 1995

[51] Int. Cl.$^6$ ................................................ C04B 35/46
[52] U.S. Cl. .......................................... 252/62.9; 501/136
[58] Field of Search .............................. 252/62.9; 501/136

[56] References Cited

PUBLICATIONS

Nishiga ki et al., "Microwave Dielectric Properties of (Ba, Sr)O–$Sm_2O_3$–$TiO_2$ Ceramics", Ceramic Bulletin, vol., 66, No. 9, 1987.

Jie Chen et al., "Microstructure and Dielectric Properties of Lead Magnesium Niobate–Pyrochlore Diphasic Mixtures", J. Am. Ceram. Soc., 73(1)68–73(1990).

Hsing–jen Wann et al., "A Capacitorless DRAM Cell on SOI Substrate", Intl. Electron Devices Meeting, Washingon, DC, Dec. 5–8, 1993.

N.A. Andreeva et al., "Concerning Ways and Means of Obtaining Materials with a Smoothes Out Temperature Dependence of the Dielectric Constant", Bull Acad. Sci. USSR, Phys. Ser. 24 1281 (1960).

Jie Chen et al., "Effect of Powder Purity and Second Phases on the Dielectric Properties of Lead Magnesium Niobate Ceramics", J. Am. Ceram. Soc., 69[12] C–303–C–305(1986).

J.D. Siegwarth et al., "Dielectric and Thermal Properties of $Pb_2Nb_2O_7$ at Low Temperature", Journal of Applied Physics, vol. 47, No. 9, Sep. 1976.

Taki Negas et al. "$BaTi_4O_9$/$Ba_2Ti_9O_{20}$–Based Ceramics Resurrected for Modern Microwave Applications", Technology, vol. 72, No. 1, Jan. 1993.

Michael T. Lanagan et al., "Dielectric Behavior of the Relaxor ($Pb[Mg_{1/3}Nb_{2/3}]O_3$–$PbTiO_3$ Solid–Solution System in the Microwave Region", J. Am. Ceram. Soc., 72[3] 481–83(1989).

Jie Chen et al., "Ordering Structure and Dielectric Properties of Undopes and La/Na–Doped $Pb[Mg_{1/3}Nb_{2/3}]O_3$", J. Am. Ceram. Soc. 72[4]593–98(1989).

S.L. Swartz et al., "Dielectric Properties of Lead–Magnesium Niobate Ceramics", Journal of the Ame. Ceramic Society, vol. 67, May 1984.

H.C. Ling et al., "High Dielectric Constant and Small Temperature Coefficient Bismuth–based dielectric Composition", J. Mater Res., vol. 5, No. 8, Aug. 1990.

H. C. Ling et al., "Lead Zinc Niobate Pyrochlore: Structue and Dielectric Properties", Journal of Materials Science 24 (1989) 541–548.

T.R. Shrout et al., "Dielectric Properties of Pyrochlore Lead Magnesium Niobate", Mat. Res. Bull., vol. 18, pp. 663–667, 1983.

*Primary Examiner*—Deborah Jones

[57] ABSTRACT

The temperature dependent dielectric constants in the vicinity of room temperature have been measured for bulk ceramics which are phase-mixtures of $Pb_2(Nb,Mg,Ti)_2O_{6+x}$ pyrochlores and $Pb(Nb,Mg,Ti)O_3$ perovskites. A band of compositions has been found in which the negative temperature coefficient of dielectric constant for the pyrochlore is very closely compensated by the positive temperature coefficient of dielectric constant of the perovskite. These compositions have dielectric constants near 200, with Q's near 200 at 1 MHz, making them an intermediate family of dielectrics between the much studied high dielectric constant low Q Barium-Strontium Titanates and low dielectric constant high Q Barium-Lanthanide Titanates.

5 Claims, 3 Drawing Sheets

PYROCHLORE BASED OXIDES WITH HIGH DIELECTRIC CONSTANT AND LOW TEMPERATURE COEFFICIENT

FIELD OF THE INVENTION

The present invention relates to crystalline ceramic materials which are useful in making capacitive components wherein the ceramic materials have a high dielectric constant and a decreased temperature coefficient of the dielectric constant as compared to barium strontium titanate ceramic materials.

BACKGROUND OF THE INVENTION

The drive to decrease the size of microelectronic and portable devices is putting considerable strain on the performance of dielectric materials currently in use. For high capacity dynamic random access memories (DRAMS) for example, once exotic materials with high dielectric constants such as Barium Strontium Titanate (BST) are being considered for use in microelectronic capacitors (T. Eimori et al. IEDM 93 631 (1993)) For the macroscopic components employed in microwave communications, bulk ceramics such as $Ba_2Ti_9O_{20}$ and $BaLn_2Ti_5O_{14}$, with dielectric constants of 40–90 and low dielectric constant temperature coefficients, 0–20 ppm/°C., are currently under active development (T. Negas, G. Yeager, S. Bell and N. Coats, Am. Cer. Soc. Bull. 72 80 (1993) and S. Nishigaki, H. Kato, S. Yano and R. Kamimura, Ceramic Bulletin 66 1405 (1987)).

Low temperature dependence of the dielectric constant is important when high temperature stability of component properties is an issue for a particular application. Such stability is not possible in high dielectric constant materials such as BST due to the high temperature dependence of the dielectric constant, K, associated with ferroelectricity.

Neutralizing the high negative temperature dependence of a ferroelectric with Curie temperature $(T_c)$ below room temperature with the high positive temperature dependence of a ferroelectric with $T_c$ above room temperature is a long standing problem in the field (N. A. Andreeva, O. A. Grushevskaya and V. I. Zhukovskii, Bull Acad. Sci. USSR, Phys. Ser. 24 1281 (1960)). Such a mixture would be expected to have a relatively large dielectric constant, relatively small temperature dependence, and a non-negligible loss factor near room temperature dependent on the quantity of high $T_c$ ferroelectric employed in the balance.

The high temperature ferroelectric perovskites $PbNb_{2/3}Mg_{1/3}O_3$ and $PbTiO_3$ and their mixtures, processing, and chemical substitutions have been extensively studied (e.g. M. T. Lanagan, N. Yang, D. C. Dube and S-J. Jang, J. Am. Ceram. Soc. 72 481 (1989); J. Chen, H. M. Chan, M. P. Harmer, J. Am. Ceram. Soc. 72 593 (1989); M. LeJeune and J. P. Boilot, Am. Ceram. Soc. Bull. 64 679 (1985); and S. L. Swartz, T. R. Shrout, W. A. Schulze and L. E. Cross, J. Am. Ceram. Soc. 67 311 (1984)). The pyrochlore structure $Pb_2(Nb, Mg)_2O_{6+x}$ low $T_c$ ferroelectrics have also received some attention (T. R. Shrout and S. L. Swartz, Mat. Res. Bull. 18 663 (1983); and J. D. Siegwarth, W. N. Lawless, and A. J. Morrow, J. Appl. Phys. 47 3789 (1976), but have not been of general practical interest except as impurity phases in ceramics intended to be entirely perovskite phase material (J. Chen and M. P. Harmer, J. Am. Ceram. Soc. 73 68 (1990) and J. Chen, A. Gorton, H. M. Chan and M. P. Harmer, J. Am. Ceram. Soc. 69 303 (1986). A study of $Pb_2(Nb, Zn)_2O_{6+x}$ pyrochlore-$PbTiO_3$ perovskite system found multiple phase ceramics with K near 120 and a TCK (temperature coefficient of the dielectric constant) of approximately 200 ppm/°C. near room temperature (J. Chen, A. Gorton, H. M. Chan and M. P. Harmer, J. Am. Ceram. Soc. 69 303 (1986)). The same authors found the presence of low TCK ceramics in the $Bi_2O_3$—NiO—ZnO—$Nb_2O_5$ system (H. C. Ling, M. F. Yah and W. W. Rhodes, J. Mat. Sci. 24 541 (1989) and H. C. Ling, M. F. Yan and W. W. Rhodes, J. Mat. Res. 5 1752 (1990)) with K's in the range 70–100 and corresponding TCK's from +200 to −125 ppm/°C., with lowest TCK's near compositions where K=90.

SUMMARY OF THE INVENTION

The present invention balances the temperature dependence of low $T_c$ pyrochlore phases $Pb_2(Nb, Mg, Ti)_2O_{6+x}$ with small admixtures of the high $T_c$ perovskite $Pb(Nb, Mg, Ti)O_3$.

It has been found that the resulting materials have dielectric constants near 200 which vary ±100 ppm in an 80° C. range of temperature around 20° C. The Q values, due to the presence of the perovskite are near 200. Considering all their properties, these new dielectric materials represent an intermediate class between BST's being considered for microelectronic applications and BLT's being considered for bulk application.

In the present invention, it has been found that dielectric materials which are made of appropriate mixture of $Pb_2(Nb,Mg, Ti)_2O_{6.5+x}$ pyrochlore and $Pb(Nb,Mg, Ti)O_3$ perovskite can have dielectric constants in the vicinity of 200 with temperature variations of K of a fraction of a percent in the vicinity of room temperature. Given the great similarity of the chemistry of these materials to the well studied ferroelectric perovskites such as PZT, the same bulk-form processing and thin film deposition techniques already employed and well known for fabrication of electronic devices with those materials should be directly transferrable. With their combination of relatively large dielectric constants and low thermal coefficient of dielectric constants, these materials may fill electronics applications niches where low volume or area and good thermal stability capacitive elements are required.

DETAILED DESCRIPTION OF THE INVENTION

In the present invention it has been found that a good combination of high dielectric constant and small temperature dependence of dielectric constant was possible in the quaternary system PbO—MgO—$Nb_2O_5$—$TiO_2$ in the plane where perovskite and Pyrochlores were in equilibrium, e.g. and preferably 1PbO: Σ(Mg+Ti +Nb)=1. The most favorable and most preferred materials were in the $Pb_2Mg_{1/3}Nb_{2/3}O_{0.65}$-$PbTiO_3$-$PbMg_{1/3}Nb_{2/3}O_3$ triangle.

Powder X-ray diffraction characterization of these materials showed that Nb, Mg and Ti formed broad ranges of solid solution in both pyrochlore and perovskite phases, with dielectric constants of both single phase and multiphase materials varying significantly as a function of transition metal ratios. A preferred mixture which were the favorably compensated materials were found to comprise mixtures of (estimated from the diffraction measurements) 90–95% $Pb_2(Nb, Mg, Ti)_2O_{6+x}$ pyrochlore with 5–10% $Pb(Nb, Mg, Ti)O_3$ perovskite. The relatively low amount of perovskite phase needed to compensate the TCK of the pyrochlore prevented the Q values of the composite materials, dominated by the loss of the ferroelectric perovskite from degrading to extremely low values.

The following examples are provided as being illustrative and are not intended to be in any way limiting on the scope of the present invention.

EXAMPLES

Starting materials for ceramic synthesis were PbO, $Nb_2O_5$, $TiO_2$ and $Mg(OH)_2$. Powders were mixed in the appropriate mole proportions and mechanically ground in an agate mortar and pestle. The powders were fired in air in dense, covered $Al_2O_3$ crucibles. The first treatment was at about 800° C. for about 16 hours followed by about 850° C. for 16 hours. After re-grinding, the powders were fired for about 4 hours at about 925° C. and about 3 hours at about 1000° C. Powders were then ground for a third time and pressed into 0.5 inch diameter pellets and fired in covered crucibles 20 mm in diameter by 4 mm high for about 4 hours at about 1100° C. and about 3 hours at about 1200° C. The covers and short reaction times were precautions against PbO volatility, and the surfaces were ground down before the pellets were tested for their dielectric properties. There was no indication of PbO loss.

Contacts were made with a 1:1 Ga:In alloy painted on the pellet surfaces. Dielectric constants and dissipation factors (loss tangents) were measured at 100 kHz and 1 MHz with an HP4192A Impedance analyser, with variable temperatures achieved between −20° and 60° C. in a RANSCO variable temperature chamber.

In the present invention, investigations of the Pb-Nb-Mg-Ti-O phase diagram were centered on the ternary plane where the ratio of PbO to the sum of ($Nb_2O_5$+MgO+$TiO_2$) was equal to 1:1; e.g. the plane containing the $PbTiO_3$, and $PbMg_{1/3}Nb_{2/3}O_3$ perovskites and the $Pb_2Nb_2O_7$ and $Pb_2Mg_{1/3}Nb_{2/3}O_{6.5}$ pyrochlores. Dielectric constants at 20° C. and their temperature dependencies were measured at a variety of compositions.

Figure 1:
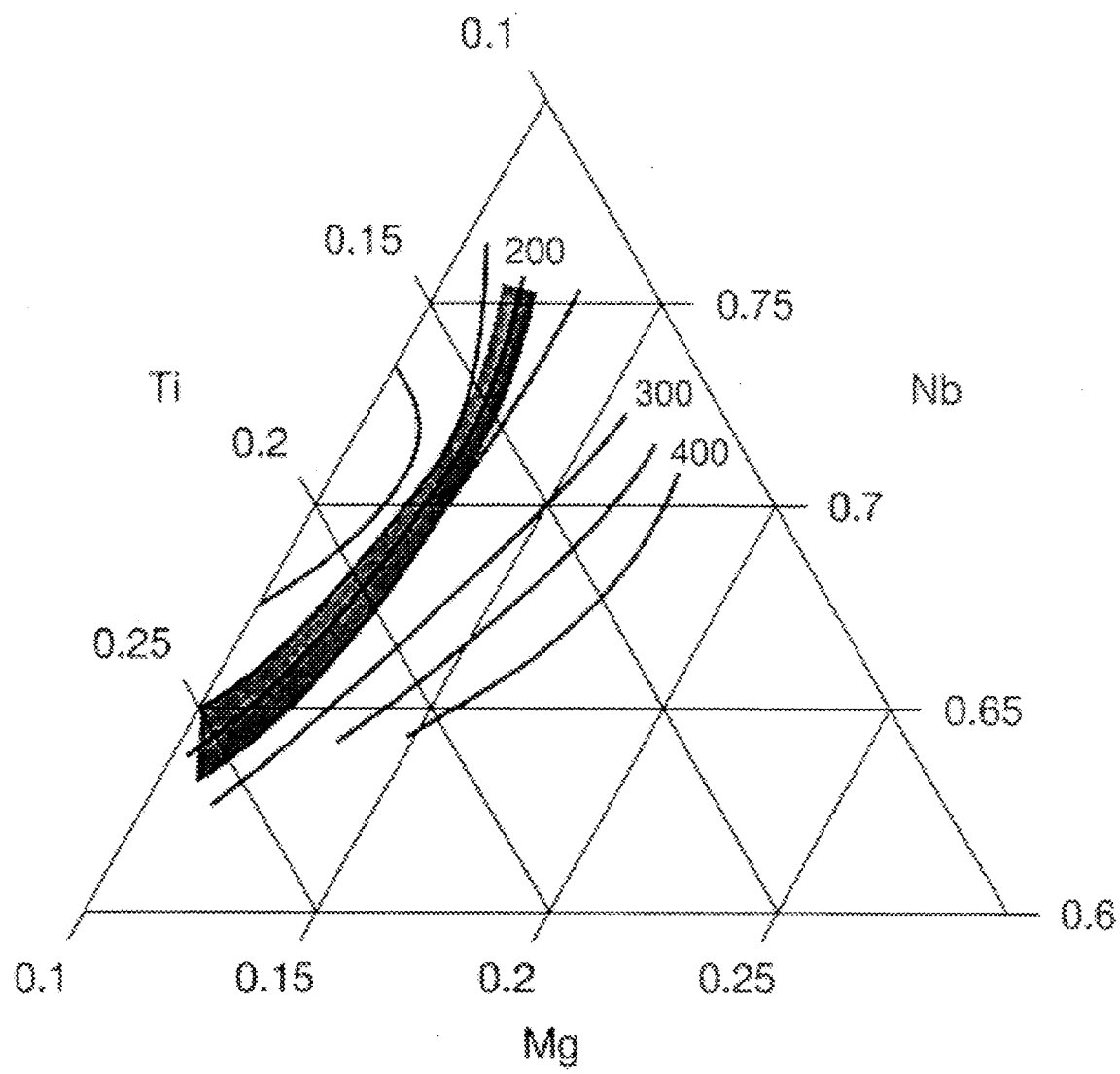
FIG. 1: Part of the PbO—$N_2O_5$—MgO—$TiO_2$ phase diagram in the plane where Pb: Σ(Nb+Mg+Ti)=1:1. Contours represent values of dielectric constant at 20° C. The shaded area is the composition region where the slope of K vs. T changes from negative at low K to positive at high K.

It was found that one particular region of the phase diagram; shown in FIG. 1, displayed a good combination of high dielectric constant (K) and low temperature dependence of dielectric constant (TCK). FIG. 1 shows contour lines, at intervals of $\Delta K=50$, for K between 100 and 400 in this small section of the 1PbO:(xNb+yMg+zTi)O 5/2x+y+2z quaternary plane where x+y+z=1. Shown in the shaded region of FIG. 1 near the k=200 contour line is the set of compositions where TCK changes sign from negative at lower dielectric constants to positive at higher dielectric constants. Increasingly positive TCKs accompany the higher dielectric constants as the Pb(Nb,Mg,Ti)$O_3$ perovskite phase increases in proportion. Two parts of this shaded composition region were selected for more detailed study, near 0.15 Ti and between 0.20–0.25 Ti contents, to find the best balanced compositions for high K and low TCK in the vicinity of room temperature.

Figure 2:
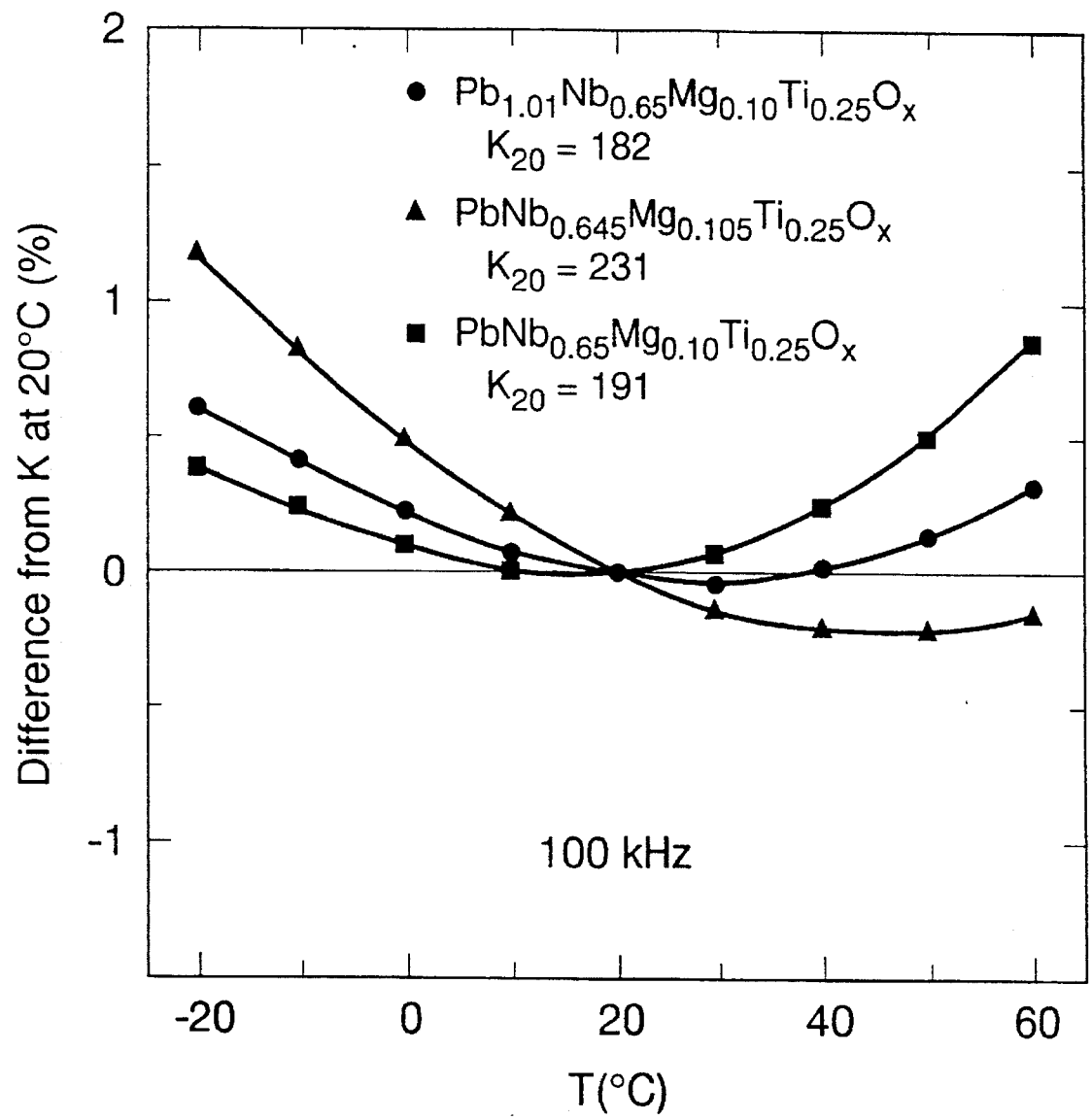
FIG. 2: Variation of K with temperature near 20° C. for some of the best compensated materials.
Figure 3:
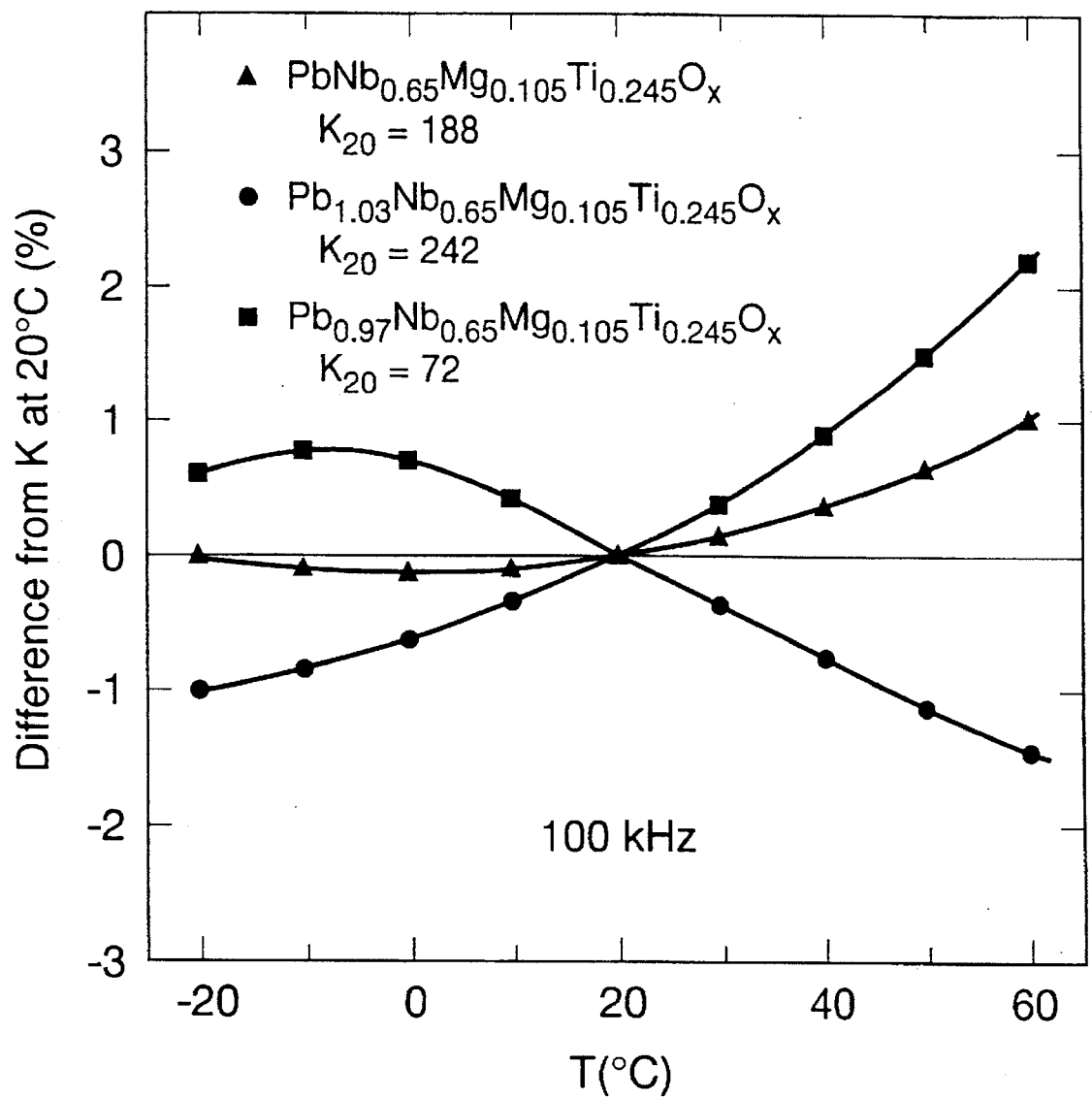
FIG. 3: Variation of K with temperature near 20° C. for a particular Nb:Mg.:Ti ratio as a function of Pb excess and deficiency.

A summary of the dielectric data for the best of the materials studied in detail is presented in table 1. The data shown hereinbelow was concentrated in the region near the 0.25 Ti intersection of the shaded area in FIG. 1. Table 1 and the FIGS. 2 and 3 show 100 kHz data; the data at 1 MHz were not significantly different.

TABLE 1

Summary of Dielectric Data for Pyrochlore based Oxides Pb—Nb—Mg—Ti—O

| Composition | K (100 kHz)** | D (100 kHz)** | Total Change in K (%) −20 to +60° C. | TCK* ppm/°C. |
|---|---|---|---|---|
| $PbNb_{0.65}Mg_{0.10}Ti_{0.25}O_x$ | 191 | 0.006 | 0.8 | 100 |
| $Pb_{1.01}Nb_{0.65}Mg_{0.10}Ti_{0.25}O_x$ | 182 | 0.005 | 0.6 | 75 |
| $PbNb_{0.645}Mg_{0.105}Ti_{0.25}O_x$ | 230 | 0.005 | 1.4 | 175 |
| $PbNb_{0.655}Mg_{0.10}Ti_{0.245}O_x$ | 198 | 0.006 | 1.6 | 200 |
| $Pb_{1.03}Nb_{0.65}Mg_{0.105}Ti_{0.245}O_x$ | 242 | 0.007 | 3.3 | 410 |
| $PbNb_{0.65}Mg_{0.105}Ti_{0.245}O_x$ | 188 | 0.006 | 1.1 | 140 |
| $Pb_{0.97}Nb_{0.65}Mg_{0.105}Ti_{0.245}O_x$ | 72 | 0.002 | 2.2 | 275 |
| $Pb_{1.01}Nb_{0.675}Mg_{0.10}Ti_{0.225}O_x$ | 218 | 0.007 | 2.0 | 250 |
| $Pb_{1.01}Nb_{0.725}Mg_{0.125}Ti_{0.15}O_x$ | 187 | 0.005 | 2.7 | 340 |
| $Pb_{0.99}Nb_{0.725}Mg_{0.125}Ti_{0.15}O_x$ | 190 | 0.005 | 2.4 | 300 |

*Because many compositions have minima in K in the temperature range of study, this TCK, which is total change ÷ temperature range, is only a relative indicator of merit. FIGS. 2 and 3 are better representations.
**Data at 1 MHz do not differ significantly.

The dielectric constants for balanced compositions are in the range of 180–240, with D values (=tan δ) in the range of 0.005–0.007. Although the general behavior of the materials is relatively robust against small changes in composition, i.e. materials are reasonably well balanced with K's near 200, the detailed temperature dependence of K near room temperature is rather sensitive to small changes in composition. This is seen in table 1, for instance, as a function of Pb excess and deficiency for the properties of $Pb_{1\pm0.03}Nb_{0.65}Mg_{0.105}Ti_{0.245}O_x$. There is also sensitivity at the ±1–2% level on the details of K vs. T to Nb, Mg and Ti content.

The temperature dependence of dielectric constant for some representative materials is shown in FIGS. 2 and 3. The minima in K vs. T in the vicinity of 20° C shown for instance in FIG. 2 are a result of the good balance between the positive and negative temperature coefficients of K for the perovskite and pyrochlore phases. FIG. 3 shows the sensitivity of K vs. T to lead excess or deficiency, with the best balanced composition close to the "stoichiometric" PbO: (Nb+Ti+Mg)=1:1 ratio. FIG. 2 and table 1 show that the best all round high K well balanced material centered around 20° C. is $Pb_{1.01}Nb_{0.65}Mg_{0.10}Ti_{0.25}O_x$, with a dielectric constant near 180 and a very shallow minimum in K vs. T at 30° C. It is also significant to note that the material with a considerably higher dielectric constant $PbNb_{0.645}Mg_{0.105}Ti_{0.25}O_x$, K near 230, is extremely well balanced at temperatures between 20° and 60° C., expected to be normal operating temperatures for electronic components, varying by 0.2% in the magnitude of K in that temperature range.

We claim:

1. A dielectric material having a high dielectric constant and a small temperature dependence of the dielectric constant comprising a quaternary system $PbO$—$MgO$—$Nb_2O_5$—$TiO_2$ in a plane of a phase diagram shown in FIG. 1 where perovskites and pyrochlores are in substantial equilibrium.

2. A dielectric material according to claim 1, wherein $1PbO: \Sigma(Mg+Ti+Nb)$ is about 1:1.

3. A dielectric material according to claim 1, in a $Pb_2Mg_{1/3}Nb_{2/3}O_{6.5}$-$PbTiO_3$-$PbMg_{1/3}Nb_{2/3}O_3$ triangle of the phase diagram of FIG. 1.

4. A dielectric material according to claim 1 comprising $PbTiO_3$ and $PbMg_{1/3}Nb_{2/3}O_3$ perovskites and $Pb_2Nb_2O_7$ and $Pb_2Mg_{1/3}Nb_{2/3}O_{6.5}$ pyrochlores in amounts that fall within the phase diagram shown in FIG. 1.

5. A dielectric material according to claim 1 comprising $Pb_xNb_yMg_zTi_t$ oxide where $0.9 \leq x \leq 1.1$, $0.6 \leq y \leq 0.8$, $0.05 \leq z \leq 0.15$, and $0.10 \leq t \leq 0.30$.

* * * * *